Sept. 20, 1960 R. S. ARIES 2,953,602
PROCESS FOR MAKING ANHYDROUS MONOMERIC FORMALDEHYDE
Filed Jan. 12, 1959 2 Sheets-Sheet 2
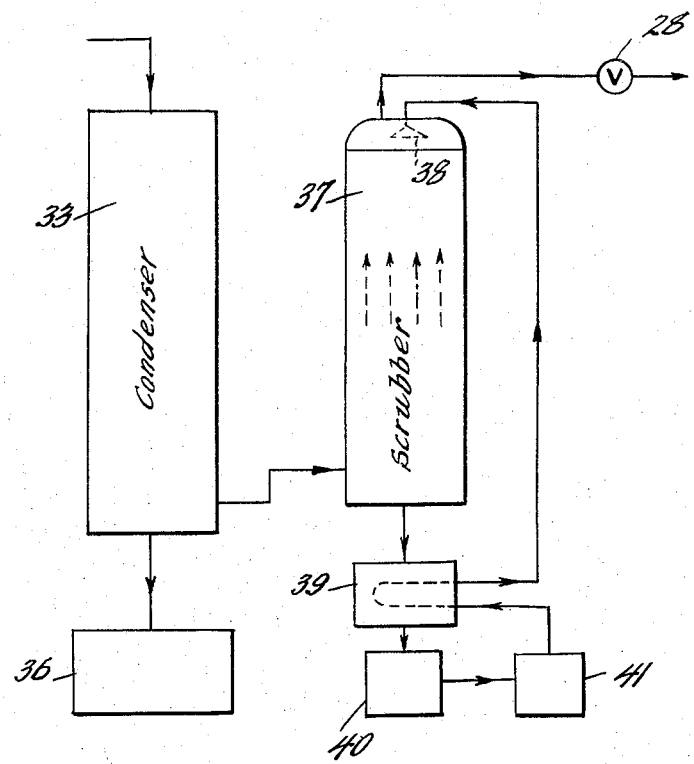
INVENTOR
Robert S. Aries,
BY Hugo E. Weisberger
ATTORNEY

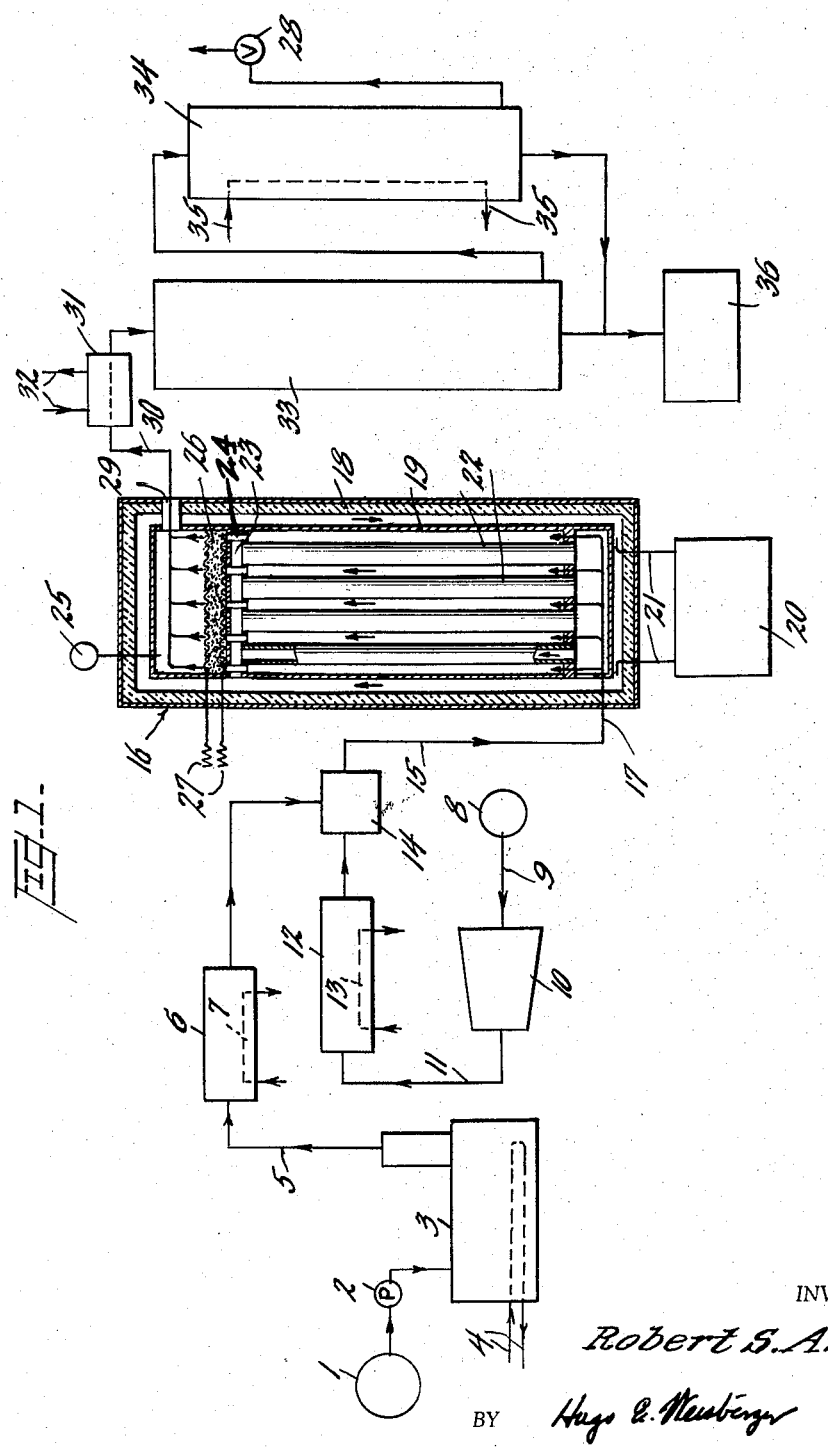

United States Patent Office 2,953,602
Patented Sept. 20, 1960

2,953,602
PROCESS FOR MAKING ANHYDROUS MONOMERIC FORMALDEHYDE

Robert S. Aries, 225 Greenwich Ave., Stamford, Conn.

Filed Jan. 12, 1959, Ser. No. 786,115

4 Claims. (Cl. 260—603)

This invention relates to anhydrous formaldehyde. More particularly, the invention concerns a novel process for the preparation of anhydrous monomeric formaldehyde by the catalytic dehydrogenation of methanol.

Commercial formaldehyde is generally an aqueous solution of formaldehyde gas, averaging from 35 to 44 percent of formaldehyde content, and containing in many cases up to 13 percent of dissolved methanol. It is made by oxidation of methanol or low boiling petroleum gases such as methane using silver or iron-molybdenum oxide as a catalyst.

Formaldehyde which is to be polymerized to the commercially valuable high polymeric polyoxymethylene must be pure and anhydrous, preferably of at least 99.9 percent purity. In order to prepare formaldehyde of this high purity from the commercially available forms of this compound, the aqueous formaldehyde solution ordinarily obtained must be subjected to repeated fractionation, or else fractionated and then converted into paraformaldehyde which must then be dried and pyrolyzed back to the monomer. These operations are both onerous and expensive, and moreover, during these concentrating steps, formic acid, low molecular weight polymers, and other by-products are formed which must be removed.

Methods are known in the prior art by which ethyl alcohol vapors are dehydrogenated by passage over finely divided metal catalysts at about 300° C., and by which 3 to 4 carbon alcohols are dehydrogenated by contact at 275° to 350° C. with metal oxide catalysts in pellet form. There is also known a method for combined air oxidation-dehydrogenation of methanol containing added water vapor in the presence of a silver contact catalyst, but which is essentially an oxidation method. A similar method is known wherein methanol-air mixtures are passed over silver catalysts at about 630° C. in a reaction said to be endothermic. Also ethanol vapors can be heated in absence of oxygen in presence of metal catalysts to undergo endothermic dehydrogenation, but with yields of only about 15 to 30 percent. These known methods of formaldehyde and other aldehyde production are difficult to regulate, the yields are not dependable, and impurities are formed in objectionable amounts.

In accordance with the present invention, anhydrous monomeric formaldehyde is obtained in good yield in purity ranging from 99.5 to 99.9 percent by passing methanol vapor admixed with an inert gas over a finely divided metal dehydrogenation catalyst, at a temperature between about 600° and about 800° C. The reaction involved is:

$$CH_3OH \rightarrow HCHO + H_2 - 20 \text{ Kcal}$$

As the reaction is endothermic, heat must be supplied. This may be accomplished either by passing a liquid heating medium through a jacket around the reactor in which the dehydrogenation is carried out, or by heating the catalyst electrically or by other means.

The methanol used as a starting material is preferably substantially anhydrous. The anhydrous methanol is advantageously contacted with the catalyst in vapor form, either as such or in admixture with a dry inert gas, such as, for example dry hydrogen or oxygen-free argon. The proportion of inert gas to methanol vapor may range from about 10 to about 40% by weight; advantageously about 13 to 15% may be used. Preferably the methanol vapor or the methanol vapor-inert gas mixture, or methanol and inert gas separately, are preheated to about 150° C. prior to contact with the catalyst.

The catalyst employed in carrying out the process of this invention is a dehydrogenation catalyst, such as, for example, silver or copper, in finely divided form. Thus, for example, I may employ as a catalyst finely divided electrolytic silver supported on one or more layers of silver wire gauze. The wire gauze not only serves as a support for the finely divided silver but also as an electrical conductor to provide heat for heating the finely divided silver catalyst by electric resistance heating to any desired temperature. The catalyst is preferably heated to a temperature between about 600° and 800° C., and in the case of silver, a temperature between about 700° and 800° C. is desirable. Where copper is used as a catalyst, an arrangement similar to that used for silver may be employed.

While the dehydrogenation reaction in accordance with the invention may be carried out at atmospheric pressure, it is desirable to do so under elevated pressure, for example, between about 2 and 10 atmospheres, preferably between about 5 and 8 atmospheres pressure.

The formaldehyde-hydrogen mixture or the formaldehyde-inert gas mixture leaving the reactor contains no formic acid, only traces of water, and some unreacted methanol. After cooling to condense methanol, as in a suitable type of heat exchanger, the relatively dry monomeric formaldehyde vapor may be completely dried, either by passing the product stream through one or more cold traps, or by scrubbing the product stream with a hygroscopic liquid, such as, for example, polyethylene glycol ether, or methylpentadiol.

The dried and high purity monomeric formaldehyde thus obtained in accordance with the invention may be used for subsequent polymerization to make high molecular weight polyoxymethylene either directly in admixture with hydrogen or other inert gas, or after separation from these gases. For polymerization, the monomeric formaldehyde gas stream is passed through one or more tall agitated reactors containing an inert liquid such as, for example, cyclohexane, heptane or pentane, and a small quantity of an initiator, such as a tertiary amine, for example, tri-n-butyl amine. The polymerization liquid is maintained at room temperature, the heat of polymerization being removed by suitable cooling. By employing the proper amount of residence time in the polymerization reactors, the final effluent gas is substantially pure hydrogen or other inert gas with less than 5 percent of unpolymerized formaldehyde. If hydrogen is the inert gas, it may be utilized as a fuel for heating the liquid heat transfer medium employed in the dehydrogenation reactors, as described more fully below. The slurry of polyoxymethylene in the inert solvent is continuously bled from the system and filtered. The filtrate is returned to the polymerization system, and the polymer is refined and stabilized in accordance with known methods. In practicing the process of the present invention for preparing monomeric formaldehyde, a plant or arrangement of equipment such as that represented in the accompanying drawings may be used, in which:

Fig. 1 is a semi-diagrammatic side elevation of a plant layout of apparatus for carrying out the novel process.

Fig. 2 is the same type of view as Fig. 1, but showing modifications of some of the apparatus.

Fig. 1 may be understood by reference to the description which follows, and will be additionally considered below in connection with the description of the process in Example 1. However, the general arrangement and features of Figs. 1 and 2 may be described at this point.

Referring to Fig. 1, methanol storage tank 1 is connected to methanol evaporator 3 through supply line and pump 2. Methanol evaporator 3 is heated by means of steam coils 4. The vaporized methanol passes through conduit 5 into methanol superheater 6, which is heated by steam coils 7. Hydrogen (or inert gas) storage tank 8 is connected to hydrogen compressor 10 by supply line 9, and compressed hydrogen passes through discharge pipe 11 into hydrogen preheater 12, which is heated by steam coils 13. The methanol superheater 6 and the hydrogen preheater 12 both discharge into gas mixer 14 which is connected by pipe line 15 to the reactor, shown generally at 16, through gas inlet 17. The reactor 16 is a hollow shell of steel or other suitable metal jacketed with insulation 18. Disposed within the interior of the reactor shell is a hollow jacket 19 which is adapted to circulate a suitable heating liquid, preferably an organic liquid such as dowtherm, which is supplied to jacket 19 from a conventional dowtherm furnace 20 by means of circulating inlet and outlet pipes 21. The dowtherm furnace may be heated by combustion of process hydrogen gas, as mentioned previously, or by conventional fuel. Disposed within the interior of the reactor is a set of hollow tubes 22 supported in a header type of tube sheet 23, adapted to permit circulation of the heating liquid through the tubes from jacket 19. The tubes 22 are spaced to permit flow of the methanol-hydrogen vapor mixture through numerous small tubes 24 surrounding tubes 23 into and out of the space between tubes 22. This space also serves for heating of said vapor mixture, which passes in a current depicted by arrows upward through the tube bundle, and through catalyst bed 26. The heater combustion is shown in detail for the upper header but is similar for the lower header. The gas mixture passing upward between the tubes is heated thereby, the temperature of the circulating dowtherm being controlled to give a temperature of about 700° C. at the upper end of the tube bundle, as determined by pyrometer 25. A catalyst bed 26 of finely divided metal, such as electrolytic silver, is located at the top of the tube bundle in the upper portion of the reactor. This may consist of wire gauze serving as a support for the finely divided metal catalyst; the wire gauge also serves as an electrical conductor to provide heat for heating the finely divided metal catalyst by electrical resistance, such electrical connections being shown generally at 27. The pressure in the reactor is maintained for example between about 5 and 8 atmospheres by a back pressure valve 28 located at the exit point of the system. The hot reaction gases collect in the space above the catalyst and pass from the reactor through exit opening 29 via pipe 30 which is cooled by a jacket 31 through which cooling water is circulated by inlet and outlet pipes 32. The reaction gases then pass to a condenser 33 which may be of the vertical water cooled type and which serves to condense water formed, unreacted methanol and some formaldehyde dissolved in the liquid products. The cooled gaseous stream thence passes to a cold trap 34, which is cooled by means of a refrigerant supplied to an inner coil and outer jacket by inlet and outlet pipes 35. The residual methanol-containing formaldehyde passes to collector 36, which also serves to collect the liquid condenser products.

In the form of apparatus depicted in Fig. 2, the gases leaving condenser 33 pass to a scrubber 37 under system pressure maintained as before by back pressure valve 28. In scrubber 37 the reaction gases are washed with a suitable dehydrating organic liquid, such as tetraethylene glycol dimethyl ether at 60° to 70° C., which serves to remove any water vapor from the product stream. The scrubbing liquid is introduced into the scrubber through spray 38 which distributes it evenly through the uprising gases within the scrubber. The used scrubbing liquid drains through a heat exchanger 39 into a settling tank 40, whence the liquid passes through a recovery system 41, including a filtration and fractionation system (not shown), and is reused by passage through the heat exchanger 39 and circulation to the scrubber 37.

The present invention is illustrated by the following examples, but it is not to be regarded as limited thereto.

*Example 1*

Figure 1 illustrates the process schematically. 2000 grams per hour of anhydrous methanol are evaporated in methanol evaporator 3 and superheated to 150° C. by passing through the steam-heated methanol superheater 6. 3 cubic meters of hydrogen gas per hour (13.4% by weight) are compressed and preheated to 150° C. by passing through a steam-heated hydrogen preheater 12. The hydrogen gas and the methanol vapor are mixed in a simple T-mixer 14 and charged to the bottom of the reactor 16. The reactor is jacketed as completely as possible so as to be heated by the jacket containing heated dowtherm from the dowtherm furnace 20. The reactor and its jacket are insulated carefully to conserve heat. Within the reactor a tube bundle is supported to leave free space into which the methanol vapor-hydrogen mixture flows and passes upward through the tube bundle. The temperature of the circulating dowtherm is controlled to give a temperature of 700° C. at the upper end of the tube bundle as determined by a pyrometer 25 shown. Connection of the tube sheets to the dowtherm jacket permits considerably higher flows of reactant vapor through the tube bundle with maintenance of reaction temperature. The catalyst is finely divided electrolytic silver resting on 3 layers of silver wire gauze which rests directly on the tube bundle. The wire gauze serves as support for the finely divided silver and also as electrical conductor to provide heat for heating the finely divided silver catalyst by electric resistance heating to 760° C. The jacket then serves to cut down heat loss. The dowtherm furnace can be heated by burning in it the excess hydrogen produced in the process. The pressure in the reactor is maintained between 5 and 8 atmospheres by a back pressure valve 28 at the exit from the system. The hot reaction gases pass from the space above the catalyst through water cooled pipe, the rate of water flow being such that the water boils by the heat absorbed from the reaction gases. This rapid cooling is necessary to prevent reconversion of formaldehyde to methanol by hydrogenation. The exit gases are at about 180° C. because of incomplete cooling. The hot reaction gas (ca. 180° C.) passes through a vertical water-cooled condenser where any water formed and unreacted methanol and some formaldehyde dissolved in the liquid products are condensed and separated.

The cooled gaseous stream passes through a cold trap 34 where residual amounts of methanol containing formaldehyde are condensed and separated. The cold trap is cooled by passing a refrigerant through an internal coil and an outer jacket.

The final gas stream consists of 1570 grams per hour of monomeric formaldehyde together with hydrogen and may be fed directly into a polymerization unit.

*Example 2*

This run was made exactly as in Example 1, except that 3 cubic meters of oxygen-free argon was used instead of hydrogen. The final gas stream consisted of 1510 grams per hour of monomeric formaldehyde together with argon and hydrogen, and could be fed directly to a polymerization unit.

*Example 3*

Figure 2 illustrates the process schematically. The process differs from that described in Example 1 in that copper is used as the dehydrogenation catalyst. The conversion amounts to 70–73% and the non-reacted methanol is separated by means of condenser 33 as before. This condenser 33 is maintained as before under excess pressure to condense almost all the methanol and water containing some dissolved formaldehyde. The gas mixture leaving the condenser at about 60° C. is passed under system pressure to a scrubbing tower 37 where it is washed under system pressure with tetraethylene glycol dimethyl ether at 60–70° C. which serves to remove any water vapor from the product stream.

The used scrubbing agent drains through the heat exchanger 39 into a settling tank 40 and is recovered by filtration and fractionation in a recovery system 41 and is re-used.

The gas stream leaving the scrubber consists of monomeric formaldehyde vapor and hydrogen and may be fed directly to a polymerization unit.

*Example 4*

This run was made exactly like Example 3, except that 3 cubic meters of oxygen-free argon was used instead of hydrogen. The final gas stream consisted of dry monomeric formaldehyde, argon and hydrogen and could be fed directly to a polymerization unit.

I claim:

1. Process for the preparation of anhydrous monomeric formaldehyde which consists essentially of passing a mixture of substantially anhydrous methanol vapor and from about 10 percent to about 40 percent by weight of a substantially dry inert gas preheated to a temperature of about 150° C. over a finely divided metal dehydrogenation catalyst selected from the group consisting of silver and copper, at a temperature between about 600° and 800° C., at a pressure between about 2 and about 10 atmospheres, cooling the formaldehyde vapors to about 180° C., and recovering the formaldehyde formed.

2. Process for the preparation of anhydrous monomeric formaldehyde which consists essentially of passing substantially anhydrous methanol vapor admixed with from about 10 percent to about 40 percent by weight of a substantially dry inert gas over a finely divided metal dehydrogenation catalyst selected from the group consisting of silver and copper at a temperature between about 600° and 800° C., at a pressure between about 2 and about 10 atmospheres, and recovering the formaldehyde formed.

3. Process for the preparation of anhydrous monomeric formaldehyde which consists essentially of passing a mixture of substantially anhydrous methanol and from about 10 percent to about 40 percent by weight of a substantially dry inert gas over finely divided silver dehydrogenation catalyst at a temperature between about 700° and 800° C., at a pressure between about 2 and about 10 atmospheres, and recovering the formaldehyde formed.

4. Process for the preparation of anhydrous monomeric formaldehyde which consists essentially of passing a mixture of anhydrous methanol vapor and from about 13 to about 15 percent by weight of dry hydrogen gas which has been preheated to a temperature of about 150° C. over a finely divided silver dehydrogenation catalyst at a temperature between about 700° and about 800° C. and a pressure between about 5 and 8 atmospheres, and recovering the formaldehyde formed.

References Cited in the file of this patent

UNITED STATES PATENTS 2,111,584    Eversole --------------- Mar. 22, 1938